UNITED STATES PATENT OFFICE.

DANIEL A. GOODMAN, OF SALISBURY, NORTH CAROLINA.

PROCESS OF TREATING HIDES.

SPECIFICATION forming part of Letters Patent No. 528,427, dated October 30, 1894.

Application filed January 2, 1894. Serial No. 495,431. (No specimens.)

*To all whom it may concern:*

Be it known that I, DANIEL A. GOODMAN, a citizen of the United States, residing at Salisbury, in the county of Rowan and State of North Carolina, have invented certain new and useful Improvements in Processes of Treating Hides; and I do declare the following to be a full, clear, and exact description of the invention, such as will enable others skilled in the art to which it appertains to make and use the same.

This invention relates to the treatment of raw hides after they have been depilated and bated and prior to subjecting them to the action of the tan liquor.

The purpose of the invention is the saving of time and labor and the production of leather of superior quality and high grade and capable of a fine finish.

To effect the desired results the raw hides after being depilated and bated, in the usual manner, sour bating being preferred, are treated in a mixture of water, wheat bran, common salt, red arsenic, common starch, and sulphuric acid. After being immersed a proper time the hides are removed from the bath and thoroughly drained and again subjected to a bath of hyposulphite of soda which neutralizes the acid and prevents the hides being affected by the humid changes of the atmosphere. After the hides are removed from this bath they are tanned in any of the usual ways.

The mixture constituting the first bath is composed of the following ingredients in about the proportions set forth, *i. e.:* water, one hundred gallons; wheat bran, seventy-five pounds; common salt, fifty pounds; red arsenic, two ounces; common starch, one pound; sulphuric acid, twenty-five pounds.

The water should be boiling and the red arsenic, wheat bran, common salt, and starch added thereto. This mixture is allowed to cool after which the sulphuric acid is added and the whole thoroughly agitated.

The red arsenic is the commercial disulphide of arsenic, $As_2 S_2$, produced artificially and is dissolved in a portion of the hot water, the solution being added to the mixture of bran, salt, starch and water and commingled therewith. This ingredient preserves and purifies the hides. The sulphuric acid opens the glands and pores of the hides, and with the bran partially tans the same. The function of the starch is to line the pores or glands and maintain them in an open or gaping condition to drink in the tanning solution.

The second bath is prepared by taking one hundred gallons of warm water to which about fifteen pounds of hyposulphite of soda are added. This bath neutralizes the acid and renders the hides pliable and prevents them being affected by humid changes in the atmosphere.

The hides are immersed about twenty-four hours in the first bath, and about two hours in the second bath.

Having thus described my invention, what I claim as new, and desire to secure by Letters Patent, is—

The herein described process of treating raw hides after they have first been depilated and bated in any of the usual ways which consists in first subjecting them to a bath composed of water, red arsenic, wheat bran, salt, starch and sulphuric acid in about the proportions set forth; second, removing the hides from the bath and thoroughly draining them; third, treating the hides in a bath of water and hyposulphite of soda in about the proportions specified, lastly tanning the hides in any of the well known ways.

In testimony whereof I affix my signature in presence of two witnesses.

DANIEL A. GOODMAN.

Witnesses:
E. C. WHEELER,
J. F. MCCUBBINS.